3,017,276
FLUID EMULSIFIER FOR ICE CREAM
William H. Knightly, Wilmington, Del., assignor to Atlas Chemical Industries, Inc., Wilmington, Del., a corporation of Delaware
No Drawing. Filed Jan. 29, 1959, Ser. No. 789,780
5 Claims. (Cl. 99—136)

This invention relates to fluid food emulsifiers and compositions containing the same, and which are especially adapted to use in ice cream compositions.

As the technology of ice cream manufacture progresses the requirements with respect to the properties and functions of emulsifiers in the ice cream formulation change. In the older batch freezers a major problem was the time required to whip sufficient air into the freezing liquid to yield a finished product of desired lightness and texture. Emulsifiers were rated primarily on their effectiveness in improving the whipping action, i.e., on the extent of overrun and the speed with which it was obtained.

With the advent of the more powerful continuous freezers with air controls the obtention of overrun is no longer the primary function of emulsifiers in ice cream and the search, currently, is for emulsifiers which will promote "dryness" and stiffness in the frozen product. Wet ice creams are slack and do not package cleanly and neatly. They tend to melt and run over the surface of the filling and package equipment resulting in an unsightly and unsanitary operation. A sharply characterizing property of a dry ice cream is its low gloss. Dryness may thus be expressed in terms of reflectance measurements, a low reflectance value indicating a dry ice cream. In the production of ice cream novelties to be encased in chocolate or confectioner's coatings, extreme dryness and stiffness in the ice cream is essential since the coatings do not adhere properly to "wet" ice cream. Moreover, wet ice creams have poor extrusion characteristics whereas dry ice cream extrudes cleanly.

Another advance in the technology of ice cream manufacture which has modified the requirements of emulsifier properties is automation. In automatic operation it is highly desirable, if not indeed necessary, that all ingredients be meterable and pumpable, i.e., fluid rather than solid. In the older batch processes solid ingredients could be weighed and added to the mixing vessels or freezers if necessary but in continuous, automatic equipment problems of design and operation are very much simplified if all ingredients can be metered on a volume basis and transported in fluid streams.

It is accordingly an object of this invention to provide novel emulsifier compositions for use in ice cream manufacture.

A further object is to provide emulsifier compositions for ice cream which are fluid at storage and operating temperatures.

Another object is to provide emulsifier compositions which are effective in very low concentrations to promote dryness in ice cream.

A still further object is to provide improved ice cream compositions containing the aforesaid novel emulsifiers.

The above and other objects will become apparent in the course of the following description of the invention and in the appended claims.

In accordance with the invention, and in order to accomplish the foregoing objects, there is provided an emulsifier the surface active component of which is a mixed partial glyceride of saturated and unsaturated fatty acids wherein the unsaturated acid radicals comprise a great preponderance of the total acid radicals. More specifically the said partial glycerides employed in the emulsifier compositions of the invention are mixtures containing predominantly mono- and di-glycerol esters, with minor amounts of triglyceride, wherein the proportion of mono ester may range from 40% to 70% of the total and wherein, of the acyl radical, at least 87% by weight is that of 14- to 18-carbon unsaturated fatty acids, the balance being the radical of saturated fatty acids.

In addition to the said surface active component the emulsifier compositions of the invention contain from 5% to 25% by weight of propylene glycol. Within the composition ranges recited, if the compositions are to be fluid at temperatures encountered in the preparation of ice cream mixes for freezing, there should be a positive correlation between the proportion of propylene glycol on the one hand and the proportions of saturated acyl radical and mono ester on the other. That is to say, in general, when the proportion of saturated acid radical is near the upper end of the permitted range, and particularly if the mono ester content of the partial glyceride is at the same time above 50%, the proportion of propylene glycol in the composition should approach the upper end of the above-cited range. As the proportion of unsaturation in the total acyl radical increases and as the proportion of diglyceride in the partial ester increases, within the ranges indicated, the proportion of propylene glycol may be, and is preferably, lowered.

*Example I*

A particularly preferred emulsifier composition in accordance with the invention comprises 89% by weight of the partial glyceride of a commercial oleic acid containing 72% oleic acid, 19% other unsaturated fatty acids and 9% saturated acids, wherein the mono ester content is 67%, and 11% propylene glycol. This composition remains liquid indefinitely at ordinary storage temperatures and is a fluid, readily dispersible in ice cream mix at normal refrigeration temperatures for dairy products. It can, therefore, be added to, and readily disperse in, the ice cream mix after it has been pasteurized and cooled and is ready for the freezer.

If the foregoing partial glyceride is compounded with a significantly lesser proportion of propylene glycol it will have a tendency to deposit a precipitate, especially on cooling, and is therefore considered to be a less preferred composition. It is still an effective ice cream emulsifier, particularly if it is added to warm ice cream mix, as for example, at the time of pasteurization.

*Example II*

Another highly satisfactory emulsifier composition which remains clear and fluid at all operating temperatures is composed of 92% of the mixed partial glycerides of the same commercial oleic acid characterized in Example I reacted in proportion to contain from 40 to 43% of monoester and 8% propylene glycol.

*Example III*

An emulsifier composition prepared by mixing 20% by weight of propylene glycol with 80% by weight of a partial glyceride of the commercial oleic acid described in Example I, wherein the monoglyceride content is 63%, is likewise effective in the formulation of ice cream of satisfactory dryness and texture.

*Example IV*

A satisfactory emulsifier composition is obtained by admixing 6% by weight of propylene glycol with 94% by weight of a partial glyceride of a commercial oleic acid containing by analysis 76% oleic acid, 16% other 14- to 18-carbon unsaturated acids and 8% saturated acids, said partial ester containing 42% monoglycerides.

This invention is not concerned with method for preparing the mixed partial glycerides employed in the emulsifier compositions. Methods for preparing partial glycerides of controlled mono ester content are well known, and selection of a fatty acid stock for esterification which contains the indicated ratio of 14–18 carbon unsaturated acids to saturated fatty acids is within the skill of the art.

The partial glyceride mixtures and emulsifier compositions of the invention are extremely efficient and may be used in proportions as small as 0.05% by weight in ice cream formulation to obtain products suitable for bulk packaging. Definite improvement in the dryness is noted when as little as 0.03% is employed. To obtain ice cream of exceptional dryness, suitable for extrusion packaging and/or for the production of ice cream novelties, somewhat larger proportions of the emulsifier may be used such as 0.1% or 0.15%. In general it is unnecessary to employ more than about 0.2% in any formulation. As has been indicated before the emulsifier compositions, being fluid, may be added to the ice cream mix at any stage before freezing. They may be added, if desired, in increments. Thus, a primary batch of ice cream mix containing 0.05% of an emulsifier in accordance with the invention might be prepared, pasteurized and aged in the usual manner and partially used up in the production of bulk package product. The remainder of the batch could be diverted to the production of molded or extruded products where a higher degree of dryness is desirable by adding, for example, another 0.05% of the emulsifier to the cooled and aged mix.

The following specific examples illustrate the use of mixed partial glycerides and emulsifier compositions of the invention in the preparation of ice cream.

*Example V*

6,000 grams of ice cream mix containing 12% butterfat, 11% serum solids, 15% sucrose, 0.2% sodium carboxymethyl cellulose and 0.05% of the emulsifier of Example I were pasteurized at 160° F. for 20 minutes. The butterfat was derived from fresh 40% cream. The pasteurized mix was subjected to a 2-stage homogenization at 160° F., using 2,000 pounds per square inch (gauge) in the first stage and 500 pounds in the second. The homogenized mix was cooled rapidly to 38–40° F., utilizing a conventional surface heat exchanger. After aging overnight at that temperature, the mix was transferred to a batch freezer and cooled to 24° F. in 8 minutes with whipping agitation. While continuing the agitation and maintaining the temperature at approximately 24° F. samples were withdrawn at 2 minute intervals for the determination of overrun and reflectance (a measure of dryness).

The ice cream was drawn when the desired overrun of 90% had been reached at which point the gloss reading was 7 indicating a very dry ice cream. It possessed all the qualities required for bulk packaging and such special packaging operations as cup filling, pint and half-gallon package, etc. The ice cream possessed an improved body and texture over the product of a comparison batch containing no emulsifier, and was very much drier.

*Example VI*

The foregoing example was repeated substituting for the emulsifier composition thereof 0.05% of the same partial glycerol ester of commercial oleic acid in the absence of any propylene glycol. The resulting ice cream was virtually indistinguishable in properties from that of Example V.

*Example VII*

This example illustrates that the emulsifier composition of the invention may, if desired, be added in increments and at different stages in the preparation of the ice cream mix.

A batch of ice cream mix was prepared following the procedure of Example V through the step of ageing the cooled, homogenized, unfrozen mix containing 0.05% emulsifier composition of Example I. Just before introducing the mix into the freezer an additional 0.05% by weight of the same emulsifier was added to the charge. Whipping and freezing was then carried out as described in Example V. The ice cream was drawn at an overrun of 80% at which time it exhibited a gloss reading of 7. It was noticeably stiffer than the product of Example V and was suitable for extrusion packaging, molding, or coating with chocolate or confectioner's coating.

*Example VIII*

7,000 grams of ice cream mix were prepared containing 10% fat, 13% serum solids, 16% sucrose, 0.15% of a stabilizer composed of 80 parts sodium carboxymethyl cellulose and 20 parts carrageenin, and 0.15% of the emulsifier described in Example II. The mix was pasteurized, homogenized, cooled, aged and frozen under the conditions described in Example V. On evaluation the ice cream as drawn from the freezer at 77% overrun possessed good body and texture and was found to be extremely dry and stiff, suitable for any packaging or extrusion operation.

The foregoing examples are presented for the purpose of illustrating the invention and are not to be construed as limiting the scope thereof in any manner.

What is claimed is:

1. A fluid food emulsifier composition, stable against the separation of solids at normal refrigeration temperatures for dairy products, consisting essentially of from 5 to 25 percent by weight of propylene glycol and from 75 to 95 percent by weight of a mixed partial glyceride of saturated and unsaturated higher fatty acids of from 40% to 70% mono ester content, wherein at least 87% by weight of the acyl radical is that of 14- to 18-carbon unsaturated acids and the remainder is that of saturated fatty acids.

2. A fluid food emulsifier composition, stable against the separation of solids at normal refrigeration temperatures for dairy products, consisting essentially of 11% by weight propylene glycol and 89% by weight of a mixed partial glyceride, containing between 55 and 65% mono ester, of a fatty acid mixture containing 72% oleic acid, 19% other 14- to 18-carbon unsaturated fatty acids, and 9% saturated fatty acids.

3. An ice cream product containing as emulsifier from 0.03% to 0.2% of a mixed partial glyceride of saturated and unsaturated higher fatty acids of from 40% to 65% mono ester content, wherein at least 87% by weight of the acyl radical is that of 14- to 18-carbon unsaturated acids and the remainder is that of saturated fatty acids.

4. An ice cream product containing as emulsifier from 0.03% to 0.2% by weight of an emulsifier composition consisting essentially of from 5 to 25 percent by weight of propylene glycol and from 75 to 95 percent by weight of a mixed partial glyceride of saturated and unsaturated higher fatty acids of from 40% to 70% mono ester content, wherein at least 87 percent by weight of the acyl radical is that of 14- to 18-carbon unsaturated acids and the remainder is that of saturated fatty acids.

5. An ice cream product containing as emulsifier from 0.05% to 0.15% by weight of an emulsifier composition consisting essentially of 11% by weight of propylene glycol and 89% by weight of a mixed partial glyceride, containing between 55 and 65% of mono ester, of a fatty acid mixture containing 72% oleic acid, 19% other 14- to 18-carbon unsaturated acids and 9% associated saturated acids.

References Cited in the file of this patent

UNITED STATES PATENTS

| | | |
|---|---|---|
| 2,587,369 | Nash | Feb. 26, 1952 |
| 2,665,216 | Kamlet | Jan. 5, 1954 |
| 2,821,480 | Hilker | Jan. 28, 1958 |
| 2,823,129 | Steinitz | Feb. 11, 1958 |